Feb. 10, 1970 — F. L. BENTTINEN ET AL — 3,494,065

REFLECTING FISHING LURE

Filed March 6, 1969 — 2 Sheets-Sheet 1

INVENTORS
FREDERICK L. BENTTINEN
THEODORE H. BENTTINEN
BY
Morse, Altman & Oates
ATTORNEYS Feb. 10, 1970   F. L. BENTTINEN ETAL   3,494,065
REFLECTING FISHING LURE Filed March 6, 1969   2 Sheets-Sheet 2

INVENTORS
FREDERICK L. BENTTINEN
THEODORE H. BENTTINEN
BY
Morse, Altman & Oates
ATTORNEYS United States Patent Office 3,494,065
Patented Feb. 10, 1970

3,494,065
REFLECTING FISHING LURE
Frederick L. Benttinen, 1 Russell Road, and Theodore H. Benttinen, Lakeview Ave., both of Falmouth, Mass. 02540
Continuation-in-part of application Ser. No. 635,779, May 3, 1967. This application Mar. 6, 1969, Ser. No. 824,334
Int. Cl. A01k 91/00
U.S. Cl. 43—42.33     5 Claims

ABSTRACT OF THE DISCLOSURE

A fishing lure has the form of a small fish the skin of which is of a uniform reflective color and which comprises a layer of transparent synthetic resin material having an outer surface of minute contiguous paraboloid nodules and an inner surface of similar nodules. Each nodule is substantially contiguous with six adjacent nodules. The directions of rows of the outer nodules make small angles with corresponding rows of inner nodules whereby a travelling visual pattern of contiguous hexagons with bright centers is presented while the lure is moved.

---

This application is a continuation-in-part of our copending application Ser No. 635,779, filed May 3, 1967, for Reflecting Fishing Lure, and subsequently abandoned. The invention relates to the use of opposing paraboloid lens and reflector units in the outer surface of fishing lures.

It is well known that fish are attracted by light. An object of this invention is to create on the surface of a fishing lure points or areas of flashing reflected light which have real or apparent movement on a uniformly colored background as the lure moves through the water.

The manner of creating the apparent movement of light areas on the lure's surface by the use of paraboloid lens units and paraboloid reflector units will be fully explained with reference to the accompanying drawings in which.

Figure 1:
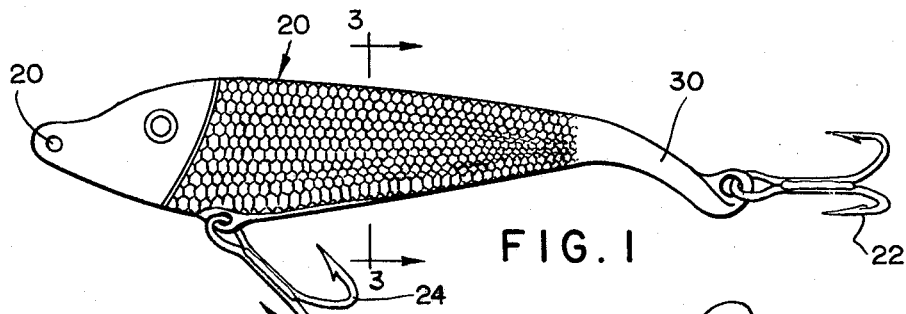
FIGURE 1 is a side elevation of a typical lure embodying the invention.
Figure 2:
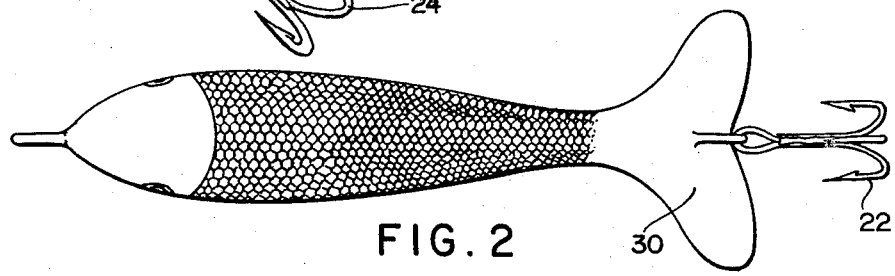
FIGURE 2 is a plan view of the same.

The lure illustrated in FIGURE 1 is one of many forms the lure might take. Generally there will be an eye 20 for attaching a trolling or casting line to the lure. Multiple fish hooks 22, 24 will be attached where desired. The lure may be ballasted in any suitable way to keep the dorsal side uppermost. For this purpose a hollow 26 is created in the upper portion of the solid body member 28. The tail portion 30 is shaped in such a manner that the face presented to the water will cause the lure to rock and yaw as the lure is pulled through the water.

Figure 3:
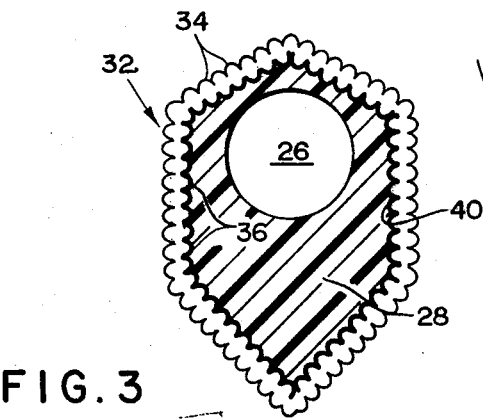
FIGURE 3 is an enlarged cross section of FIGURE 1 taken substantially along line 3—3.
Figure 4:
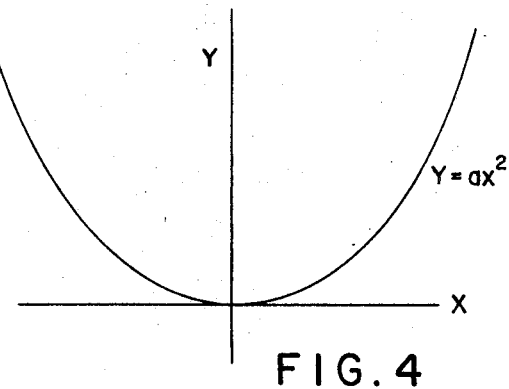
FIGURE 4 is a graphic presentation of a parabolic curve.

The body 28 may have any cross-sectional shape such as a regular polygon, an irregular polygon as shown in FIGURE 3 or a closed curve as an oval of an ellipse.

Figure 5:
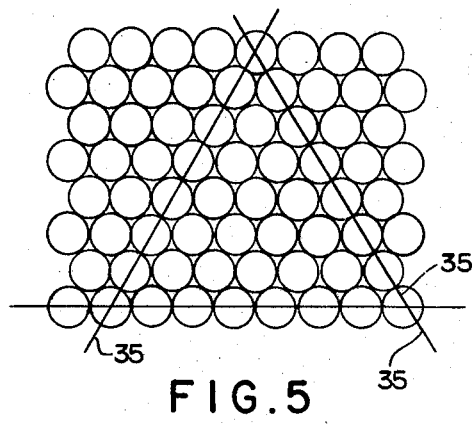
FIGURE 5 is an enlarged plan view of a number of contiguous nodules showing their arrangement.
Figure 6:
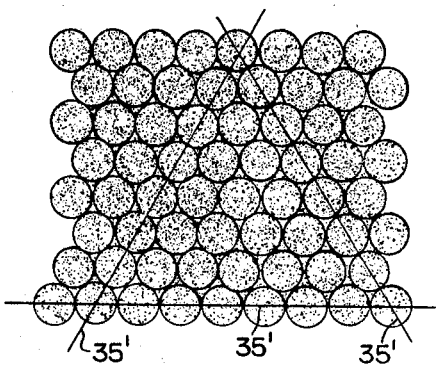
FIGURE 6 is an enlarged bottom plan view of a number of reflector nodules showing their contiguous arrangement.
Figure 7:
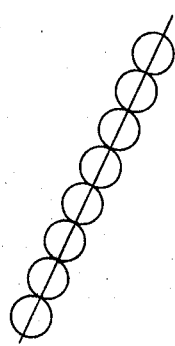
FIGURE 7 is an enlarged schematic view of a row of lens nodules.
Figure 8:
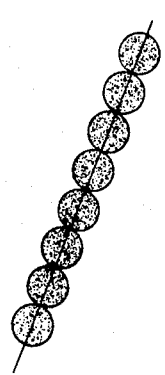
FIGURE 8 is a similar view of a row of reflector nodules.

The body 28 has a cover 32 of transparent plastic such as a polycarbonate or acrylic resin. On the outer surface of this cover are a multiplicity of contiguous paraboloid lens nodules 34 arranged as indicated in FIGURE 5. On the inner surface of the cover are similarly arranged reflector nodules 36, these being of the same size and shape as the lens nodules 34. Representative axes of rows of nodules are indicated by lines 35 and 35' in FIGURES 5 and 6. By way of example, these nodules, lens or reflector, may number approximately 100 to the inch along a row, and the distance between the vertices of a lens and its opposite reflector nodule is about .015 inch. These figures may vary according to the refraction index of the substance employed. The cover material may, if desired, be slightly tinted. Material of this type is described and illustrated in U.S. Patents Nos. 3,312,006 and 3,357,772 granted to Rowland Products, Incorporated, as assignee of William P. Rowland.

The inner surface of the cover member 32 may be coated with a suitable reflective material 40 which may also be colored. The reflective function may be achieved in various ways. For example, the body member 28 may have parabolic hollows molded into its outer surface into which a reflective material 40 may be metalized before the molding thereon of the clear cover member 32. Another method is to make the body member 28 of reflective material which parabolic hollows molded in its surface to serve as reflectors when the cover member 32 is molded thereon. Still another method is to have the cover member 32 made separately, metalize the reflector surface 36 with reflective material 40 and then cement the cover member 32 to a body member 28.

Figure 9:
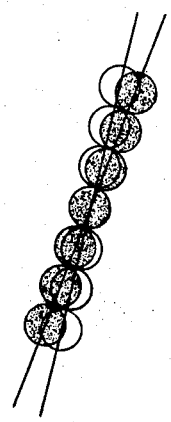
FIGURE 9 is a schematic view of FIGURE 7 superposed on FIGURE 8 with the axes of the two rows making a small angle with each other.

The desired effect of having areas of light move on the surface of the lure is created by the reflection of light from the oriented parabolic lens surface 34 and the parabolic reflector surface 36. The apparent movement appears when the rocking and yawing of the lure presents planes on the reflecting surface at different angles to the viewer. The desired orientation between the lens surface 34 and the reflective surface 36 may be clearly understood if it is imagined that these surfaces are separate sheets which are placed one on top of the other with nodules of the two sheets projecting in opposite directions and the axes of the opposing nodules aligned. An imaged slight rotation is then given to one of the sheets to get the desired orientation. When thus oriented, some lens nodules will be directly opposed to some reflective nodules, such nodules having a common axis. The great majority of lens nodules and reflective nodules will be offset in varying degrees as indicated in FIGURE 9. Where the lens nodules and reflective nodules are aligned, most of the light is reflected as a bright area but when they are offset, light is absorbed or diffused leaving the area relatively dark. When the lens surface 34 and reflective surface 36 are oriented as previously explained, a repetitive hexagonal honeycomb pattern appears, the central portions 42 of the contiguous hexagons 44 flashing very brightly with reflected light. If FIGURE 9 represents the necessary skew angle between axes of lens rows and reflector rows to create the hexagonal reflections shown in FIGURE 10, then FIGURE 11 shows the increase in the size of the reflected continguous hexagons 46 as the skew angle between axes of lens rows and reflector rows is smaller in the latter. The size of the hexagonal reflections is inversely related to the magnitude of the angle between lens rows and reflector rows.

Figure 10:
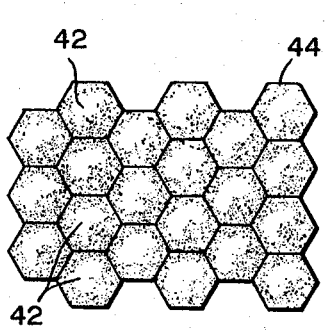
FIGURE 10 shows the general appearance the reflection of light takes on the surface of the lure when the axes of the rows of lenses and the axes of the rows of reflectors make a small angle between them.
Figure 11:
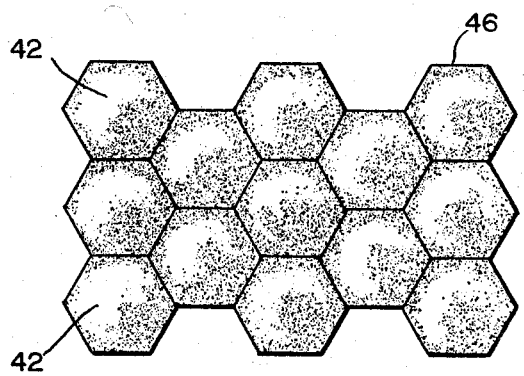
FIGURE 11 shows a similar but larger pattern which results when a smaller angle between the axes of the rows is employed.

As the lure is rocked on a longitudinal axis so that the sides of the lure move up and down, the bright areas 42 of the representative reflections in FIGURE 10 and FIGURE 11 appear to move back and forth horizontally when viewed from the side. The larger the size of the reflected hexagons the further they appear to move per degree of rotation about the lure's longitudinal axis. The tail 30 of the lure is shaped in such a way that it causes the lure to rock and to yaw. The yaw is a movement of the tail end of the lure to the left and right of the direction of pull. The eye 20 at the tip of the head is the pivotal point for the yaw of the lure. The front tip of the head continues in the direction of pull without appreciable movement to left or right. When the lure is viewed from the side the yaw motion, that is, rocking about a vertical axis, causes the light areas 42 to move up and down. The combination of rock and yaw motions makes the light areas 42 move in various directions related to the direction of rock or yaw. The areas of light can have considerable or slight movement related to a given rock or yaw by choosing the desired size of hexagonal reflections. The greater the size of the hexagonal reflections the greater the movement. In turn, the size of the hexagonal reflections is inversely related to the skew angle between lens rows and reflector rows. It is therefore a simple matter to obtain a pattern of hexagons of desired size. The attraction of moving light areas is enhanced by a flashing effect when the lure moves through the water.

What we claim is:

1. A fishing lure having a substantial surface area having a reflective uniform color and covered by transparent sheet plastic material, said material having on one face thereof a multiplicity of parabolic nodules of uniform size arranged in rows, each nodule being substantially contiguous with six adjacent nodules, said sheet having a similar arrangement of nodules on its other face, the axes of the rows of nodules on one face making small angles with the corresponding axes of rows of nodules on the other face.

2. A fishing lure as described in claim 1, the nodules on said other face being coated with reflective material.

3. A fishing lure as described in claim 1, the nodules on said other face being coated with colored reflective material.

4. A fishing lure as described in claim 1, said lure being in the general form of a small fish with means including a tail portion for causing it to rock and yaw when drawn through the water.

5. A fishing lure as described in claim 4, said lure having a body portion with a hollow in the upper part thereof to keep the dorsal side uppermost, said tail portion curving downward and rearward from said body portion.

References Cited

UNITED STATES PATENTS

| | | | |
|---|---|---|---|
| 3,257,751 | 6/1966 | Benttinen et al. | 43—42.33 |
| 3,312,006 | 4/1967 | Rowland | 40—106.51 |
| 3,357,772 | 12/1967 | Rowland | 40—106.51 X |

SAMUEL KOREN, Primary Examiner

JAMES H. CZERWONKY, Assistant Examiner

U.S. Cl. X.R.

350—97, 100